United States Patent [19]

Brucker et al.

[11] Patent Number: 5,381,390
[45] Date of Patent: Jan. 10, 1995

[54] DIRECTLY OVERWRITE INFORMATION BY USING TWO RADIATION BEAMS ONTO A SINGLE MAGNETO-OPTICAL RECORDING

[75] Inventors: Charles F. Brucker, Fairport, N.Y.; Neil Smith, San Diego, Calif.

[73] Assignee: Eastman Kodak Company, Rochester, N.Y.

[21] Appl. No.: 72,262

[22] Filed: Jun. 3, 1993

[51] Int. Cl.⁶ .............................................. G11B 13/04
[52] U.S. Cl. ....................................... 369/13; 369/110
[58] Field of Search ...................... 369/13, 14, 15, 116, 369/110, 44.37, 44.38; 360/59, 114; 365/122

[56] References Cited

U.S. PATENT DOCUMENTS

| | | | |
|---|---|---|---|
| 4,679,180 | 7/1987 | Kryder et al. | 369/13 |
| 4,807,204 | 2/1989 | Mizutani et al. | 369/13 |
| 4,816,385 | 3/1989 | Gravesteijn et al. | 430/495 |
| 4,818,666 | 4/1989 | Gravesteijn et al. | 430/495 |
| 4,882,718 | 11/1989 | Kryder et al. | 369/13 |
| 4,883,710 | 11/1989 | Machida | 428/336 |
| 4,888,750 | 12/1989 | Kryder et al. | 369/13 |
| 4,893,910 | 1/1990 | Birecki | 350/377 |
| 4,922,454 | 5/1990 | Taki | 369/13 |
| 4,982,389 | 1/1991 | Nakao et al. | 369/13 |
| 4,998,231 | 3/1991 | Watanabe et al. | 369/13 |
| 5,016,232 | 5/1991 | Tadokoro et al. | 369/13 |
| 5,020,040 | 5/1991 | Lee | 369/13 |
| 5,020,041 | 5/1991 | Nakao et al. | 369/13 |
| 5,025,430 | 6/1991 | Takokoro et al. | 369/13 |
| 5,025,439 | 6/1991 | Komaki et al. | 369/100 |
| 5,049,428 | 9/1991 | Kanno et al. | 428/64 |
| 5,051,970 | 9/1991 | Ishii et al. | 369/13 |
| 5,060,208 | 10/1991 | Nagai et al. | 369/13 |
| 5,062,091 | 10/1991 | Maeda et al. | 369/13 |
| 5,199,014 | 3/1993 | Homburg et al. | 369/44.15 |
| 5,208,792 | 5/1993 | Imanaka | 369/13 |

FOREIGN PATENT DOCUMENTS

| | | | |
|---|---|---|---|
| 419955 | 4/1991 | European Pat. Off. | 369/13 |
| 2195548 | 8/1990 | Japan | 369/13 |

OTHER PUBLICATIONS

M. Hartmann, J. Bratt, and B. Jacobs, "Erasable Magneto-Optical Recording Media," IEEE Trans. Magn. 20, 1013 (1984).

A. Watanabe, Y. Yamamoto, and K. Katoh, "Three-Beam Overwritable Magneto-Optic Disk Drive," SPIE 1499, 226 (1991).

*Primary Examiner*—Robert J. Pascal
*Assistant Examiner*—Tan Dinh
*Attorney, Agent, or Firm*—Raymond L. Owens

[57] ABSTRACT

Apparatus is disclosed for the direct overwriting of an optical storage medium having a magneto-optical recording layer. The apparatus includes a condensing lens for focusing radiation from first and second radiation sources on a first and a second region respectively of the recording layer, wherein a region illuminated by the first radiation source is thereafter illuminated by the second radiation source. First and second magnets are provided. The first magnet is proximate the first radiation beam and has a first magnetic pole proximate the first region without contacting the storage medium. The second magnet is proximate the second radiation beam and has a magnetic pole opposite the first magnetic pole proximate the second region. The first magnet and the first radiation beam are selected to provide a first orientation of magnetic domains in the magneto-optical recording layer. The second magnet and the second radiation beam are selected to provide a second orientation of magnetic domains in the storage medium.

31 Claims, 6 Drawing Sheets

DIRECTLY OVERWRITE INFORMATION BY USING TWO RADIATION BEAMS ONTO A SINGLE MAGNETO-OPTICAL RECORDING

FIELD OF THE INVENTION

This invention relates generally to apparatus for storing information on optical storage media, and more particularly, to apparatus which can provide a direct overwrite of information stored on magneto-optical storage media.

BACKGROUND OF THE INVENTION

Optical storage media has proven to be attractive for the high density storage of information. More recently, optical storage media and systems have been disclosed in which a magneto-optical storage medium can have information written thereon overwritten with different information. Typically, in order to overwrite the material already stored on the magneto-optical medium, the medium must first be returned to an initial state. The magneto-optical medium can be returned to the initial state on the entire storage region or the initialization can take place in a predetermined region of the medium. When the initializing activity occurs immediately prior to and only in the region to be overwritten, the procedure is referred to as a direct overwrite.

In the related art, direct overwrite was accomplished by providing a first magnet and associated radiation (heat) source. The radiation source would heat a local area of the magneto-optical recording layer above an ordering temperature while the associated magnet would impose a predetermined initial state on the recording layer. A separate second magnet and associated radiation source were located such that the motion of the storage media would move the now oriented (i.e., by the first magnet and radiation source) region of the storage layer into position wherein the second magnet, with a magnetic field having an opposite orientation to the magnetic orientation of first magnet, applies a magnetic field thereto. The radiation from the second radiation source is applied to the storage layer region having the magnetic field from the second magnet applied thereto. When the information to be stored requires an orientation of the magneto-optical layer parallel to the orientation provided by the first magnet and first radiation source, then the power of the second radiation source is kept at a low enough value so that the illuminated region remains below the magnetic ordering temperature of the storage layer. When the information to be stored requires an orientation opposite to the orientation provided by the first magnet and the first radiation source, the power of the second radiation source is elevated to provide a temperature for the storage layer above the magnetic ordering temperature of the storage layer. As the region (or part thereof) heated above the ordering temperature is cooled in the presence of the magnetic field from the second magnet, this region of the storage layer will have an orientation opposite to that of orientation provided by the first magnet and the first radiation source. In this manner, information can be stored on storage medium which is determined by the orientation of local regions of a magneto-optical material.

Figure 1:
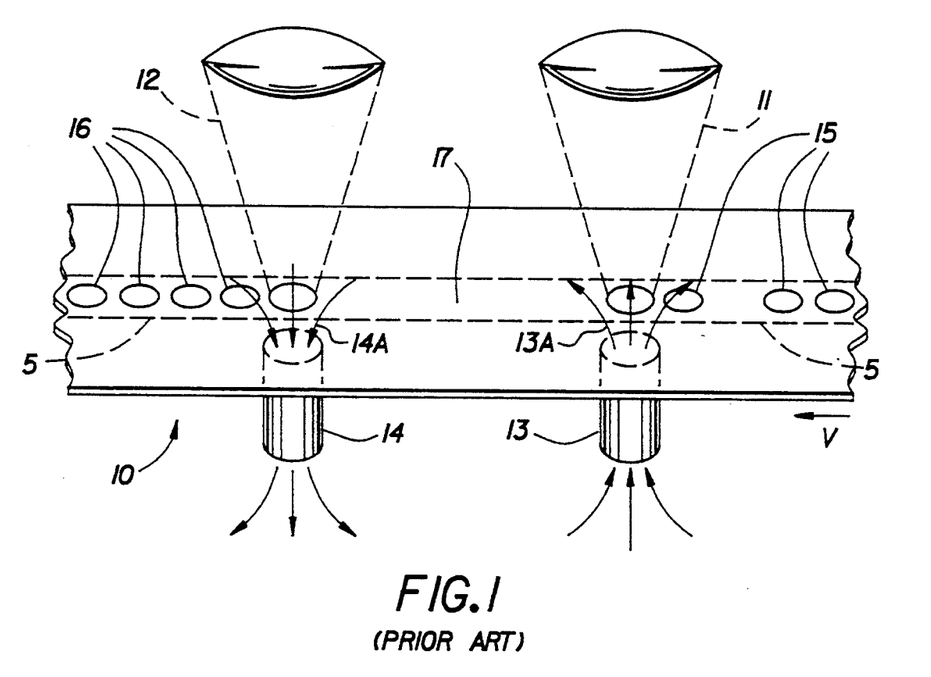
FIG. 1 is a representation of the technique by which direct overwriting is accomplished in an optical storage medium with a magneto-optical storage layer.

Referring to FIG. 1, the direct write process is illustrated. The magneto-optical storage medium 10 is moving past a first radiation beam 11, a second radiation beam 12, the magnetic field 13A of a first magnet 13, and the magnetic field 14A of a second magnet 14 in a direction indicated by the arrow v. The storage medium 10 is constrained to move such that a magneto-optical material in information track 5 interacts with the first radiation beam 11 and the first magnetic field 13A and subsequently with the second radiation field 12 and the second magnetic field 14A. The magneto-optical material of track 5 has, prior to interacting with the radiation and the magnetic fields, initial information regions 15 which have an orientation opposite to the orientation of the remainder of the magneto-optical material. As a result of the interaction with the first radiation field 11 and the first magnetic field 13A, the information regions (and the remainder of the magneto-optical material of the information track 5) are oriented in an initialized orientation. Therefore, as seen in region 17 of the information track 5, no information regions are present. As the information track 5 moves past the second radiation field 12 and the second magnetic field 4A, the radiation beam 12 is modulated to heat only selected regions above the magneto-optical material ordering temperature. Upon cooling in the presence of magnetic field 14A, the regions 16 which have been heated above the ordering temperature now have an orientation opposite to the orientation of the surrounding initialized magneto-optical material. The regions 16 become the directly overwritten (or updated) information.

The foregoing process, conceptually easy to understand, is difficult to implement in practice. In order to achieve a high density of information, the information regions must be very small. The small size of the information regions means that the positioning of the second radiation beam and the second magnetic field relative to the first radiation beam and first magnetic field is critical. Furthermore, the two sets of magnets and radiation sources would preferably be mounted on the same read/write head, a component of relatively small dimensions. However, the weight of these components would limit the dynamic performance of the read/write head.

A need has therefore been felt for apparatus and an associated method for performing a direct overwrite procedure on a magneto-optical storage medium which requires relatively compact and relatively light-weight components. In order to conserve space in the apparatus, the radiation sources and the magnets should all be positioned on the same side of the storage media. In addition, a need has been a magneto-optical medium upon which stores information on either side of the magneto-optical medium. Finally, a need has been felt for an apparatus and an associated method for simultaneously reading both sides of a magneto-optical medium upon which information has been written on both sides.

SUMMARY OF THE INVENTION

The present invention is directed to overcoming one or more of the problems set forth above. Briefly summarized, according to one aspect of the present invention, optics are provided in which a single condensing lens focuses two radiation beams on two locations of a recording layer of a magneto-optical storage medium, the storage medium being moved relative to the condensing lens so that a region of an information track is consecutively illuminated by the two radiation beams. Two magnets are located on either side of the two focused radiation beams to provide magnetic fields of opposite magnetic polarity interacting with the regions of focus on the recording layer. Each magnet is fabricated and positioned relative to the nearest radiation beam to provide an adequate magnetic field at the point of focus on the recording layer of the associated radiation beam without interfering with the radiation beam itself or coming in contact with the storage medium. As a recording track on the storage medium is moved past the first focused radiation beam and the first magnet, the magneto-optical material of the recording layer track is initialized, i.e., given a common orientation. The orientation of regions of the track as a result on the interaction between recording layer and the second radiation beam and second magnetic field is determined by the modulation on the second radiation beam, therefore providing overwritten information on the information track. The storage medium can include a magnetic material which can provide for a better alignment of the magnetic field on the storage layer.

The present invention advantageously provides compact and light-weight apparatus and an associated method for direct overwriting of information stored on a magneto-optical storage medium. The reading and writing apparatus is positioned on one side of the storage medium reducing the space requirements and providing flexibility with respect to the coupling of the read/write mechanism and the storage medium. The present invention also permits an embodiment of the storage medium in which the information can stored on both sides of the magneto-optical medium. In another embodiment, both sides of a two-sided magneto-optical storage medium can be simultaneously accessed by the read/write apparatus.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 4A shows the magnetic fields in the region of focused radiation beams for the preferred embodiment, while

DETAILED DESCRIPTION OF THE INVENTION

FIG. 1 has been described in relationship to the related art.

Figure 2:
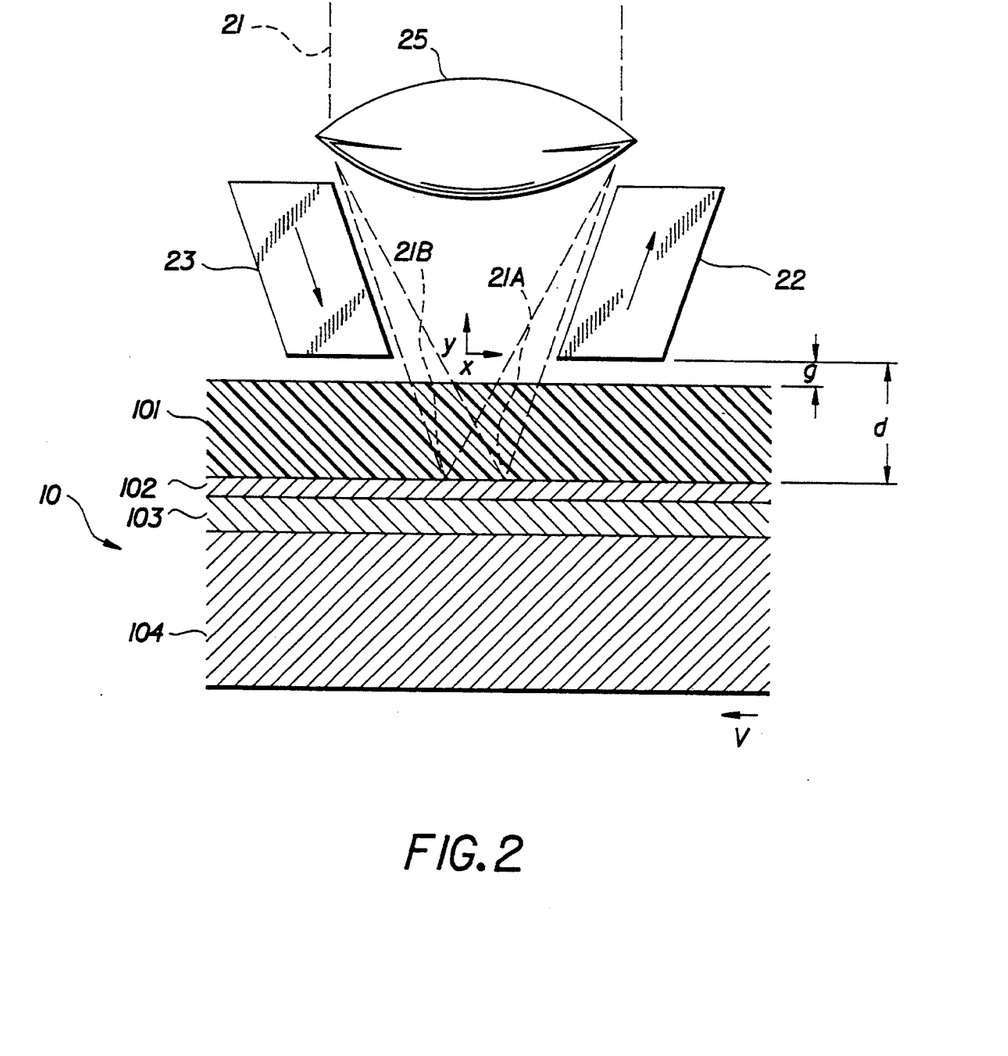
FIG. 2 is the apparatus for the direct overwriting of information on a magneto-optical storage layer in an optical storage medium according to the present invention.

Referring next to FIG. 2, the block diagram of the apparatus for the direct overwriting of information on an information track of a magneto-optical storage medium is illustrated. The storage medium 10 includes a spacer layer 101, a magneto-optical storage layer 102, optionally, a high permeability magnetic material layer 103, and a substrate 104. Condensing lens 25 focuses a radiation beam 21 onto the magneto-optical recording layer 103. The radiation beam includes two components, and each radiation beam component is focused on separate regions 21A and 21B of the recording layer. Associated with a first radiation beam focused component 21A is a first magnet 22. Associated with a second focused radiation component 21B is a second magnet 23. The magnets are adapted to be as close to the associated focused radiation without interfering with the radiation itself. Therefore, the magnets can partially encircle the cone-like focused radiation beams. The encircling magnets can add magnetic field strength at the region of focus of the associated beam and can assist in increasing the perpendicular component (relative to the magneto-optical storage layer) in the region of the radiation beam focus. As shown in FIG. 2, the bottom surfaces of magnet 22 and magnet 23 are a distance g from the spacer layer 101. The distance from the bottom surfaces of the magnets 22 and 23 to the magneto-optical recording layer 102 is designated as d. As indicated by the arrows on the magnets 22 and 23, the polarity of the two magnets is opposite. Referring to the storage medium 10, a layer of high permeability magnetic material 103 can be included to increase the perpendicular component of the magnetic field.

Figure 3:
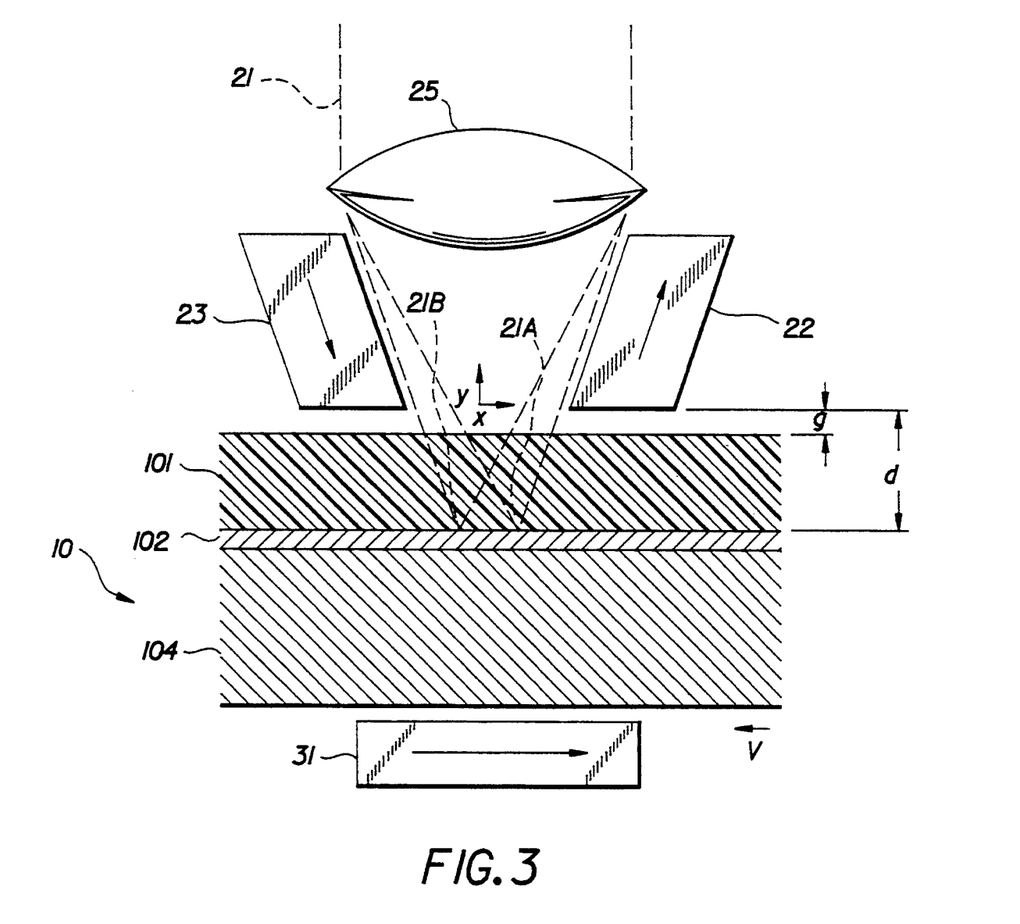
FIG. 3 is the apparatus for the direct over-writing of information on a magneto-optical storage layer in an optical storage medium in the presence of a compensating magnet.

Referring to FIG. 3, the general configuration shown in FIG. 2 is shown with the addition of a compensating magnetic 31. The compensating magnet is positioned on the opposite side of the storage medium. In addition, the high permeability magnetic material layer 102 has been removed, the compensating magnet 31 now being used to improve the magnetic field configuration in the vicinity of the focused radiation beams.

Figure 4A:
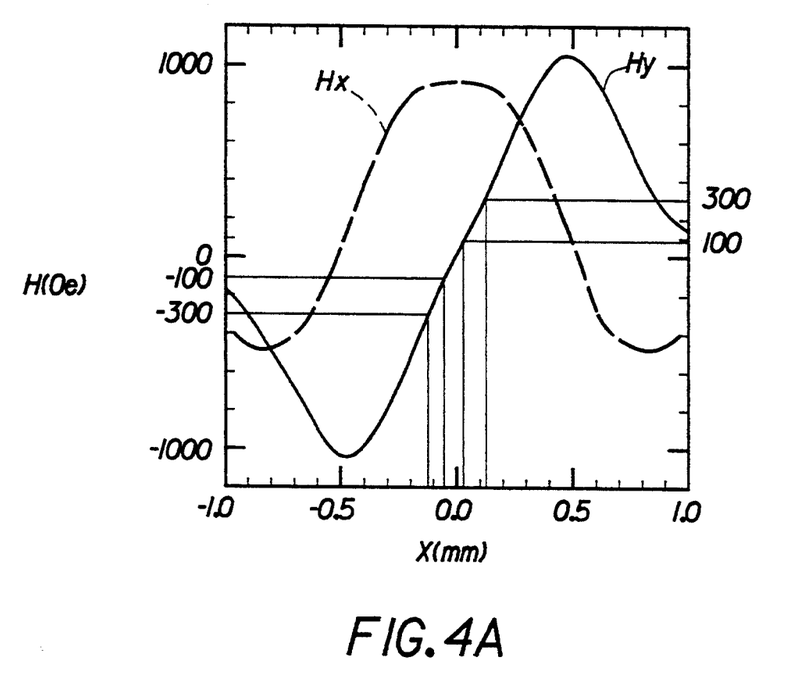
Figure 4B:
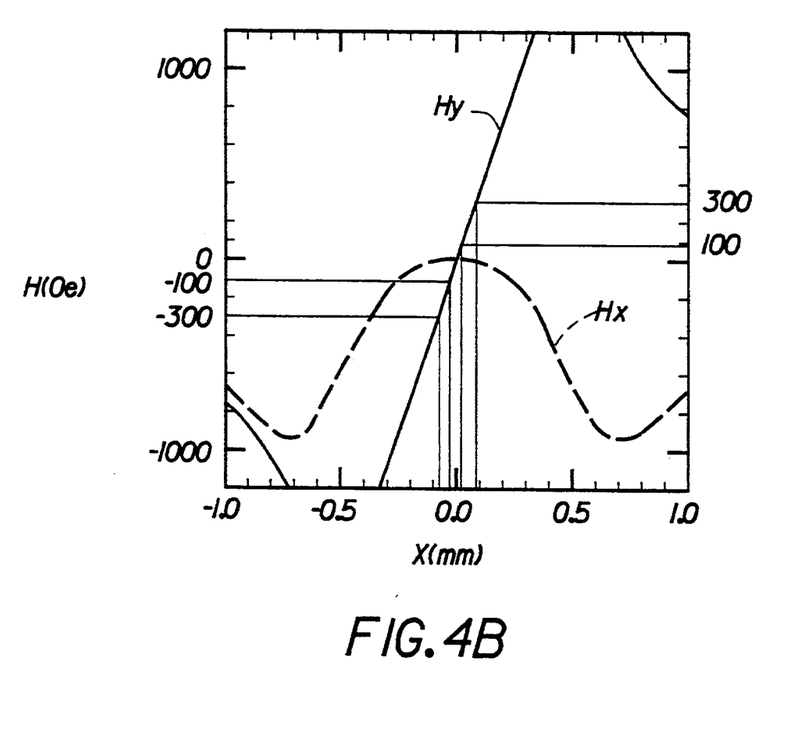
FIG. 4B shows the magnetic fields in the region of the focused radiation beams in the presence of the compensating magnet.

Referring to FIG. 4A and FIG. 4B, the magnetic fields in the region magneto-optical storage material upon which the radiation beams are focused is shown. The first and second magnets 22 and 23 typically have dimensions of 1.2 mm in length, 1.25 mm in width, 0.3 mm in thickness, and are inclined to the perpendicular by 27°. The magnets have a remanent flux density of 11 kG, e.g. FeNdB available from IG Technologies Inc. In order to provide a vertical magnetic field difference of ±300 Oe, the distance between the focused radiation of the two beams is approximately 230 μm; while the distance to provide a vertical magnetic field difference of ±100 Oe is approximately 75 μm. But these magnetic field differences are provided in the presence of horizontal magnetic field difference of approximately 900 Oe. The presence of this horizontal field placed severe restriction on the anisotropy of the magneto-optical storage layer material. However, as shown in FIG. 4B, the presence of the compensating magnet 31, generally having a thickness of 1 mm, a length of 1.25 mm, width sufficiently great to prevent fringing effects, and having remanent flux density of 11 kG, such that when positioned properly, (i.e., approximately 1 mm from the magneto-optical storage layer 102), essentially eliminates the horizontal component of the magnetic field in the region of the focused radiation beams. The addition of the compensating magnet provides vertical components which add to the fields resulting from the first and the second magnets. In order to provide a ±300 Oe field difference between the positions on the magneto-optical storage layer of the focused radiation beam, the beam must be approximately 180 μm, while for a difference of ±100 Oe, the distance between the two positions of focused radiation on the magneto-optical storage layer must be approximately 60 μm apart.

Figure 5:
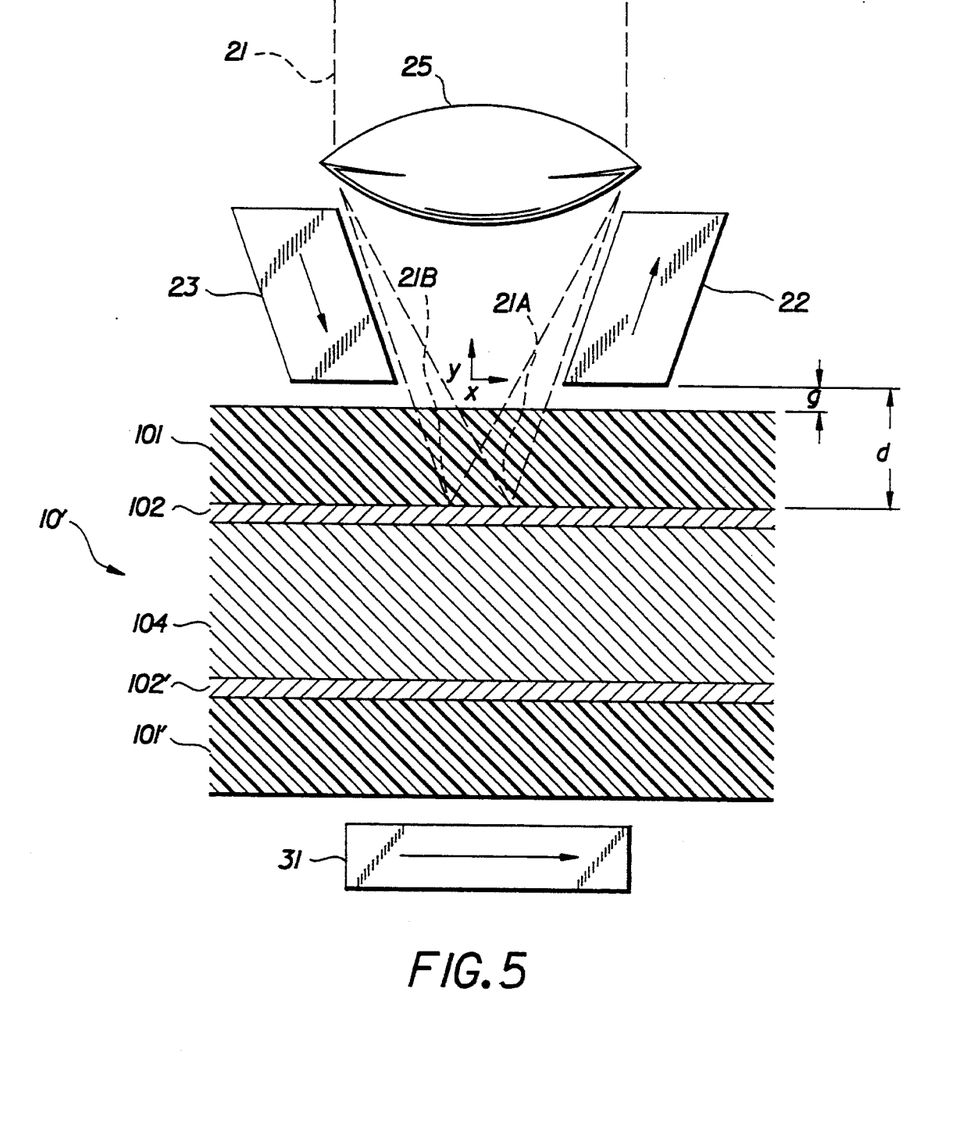
FIG. 5 is a cross-sectional diagram apparatus for the direct over-writing of information on a storage medium capable of having information stored on either side of the magneto-optical storage medium.

Referring next to FIG. 5, the direct over-writing apparatus shown in FIG. 3 can be used with a magneto-optical storage medium 10' having two magneto-optical storage layers 102 and 102'. Storage layers 102 and 102' are accessible through the spacer layers 101 and 101' respectively. The magneto-optical storage layers are symmetrically arranged on the storage medium 10' so that the field compensating magnet 31 compensates for the horizontal component of magnetic field for the magneto-optical storage layer currently being accessed by the direct over-writing apparatus. As will be clear, the substrate 104 must be sufficiently thick so that the heating of the currently accessed magneto-optical storage medium will not effect the magnetic orientation of the magneto-optical storage layer not currently being accessed.

Figure 6:
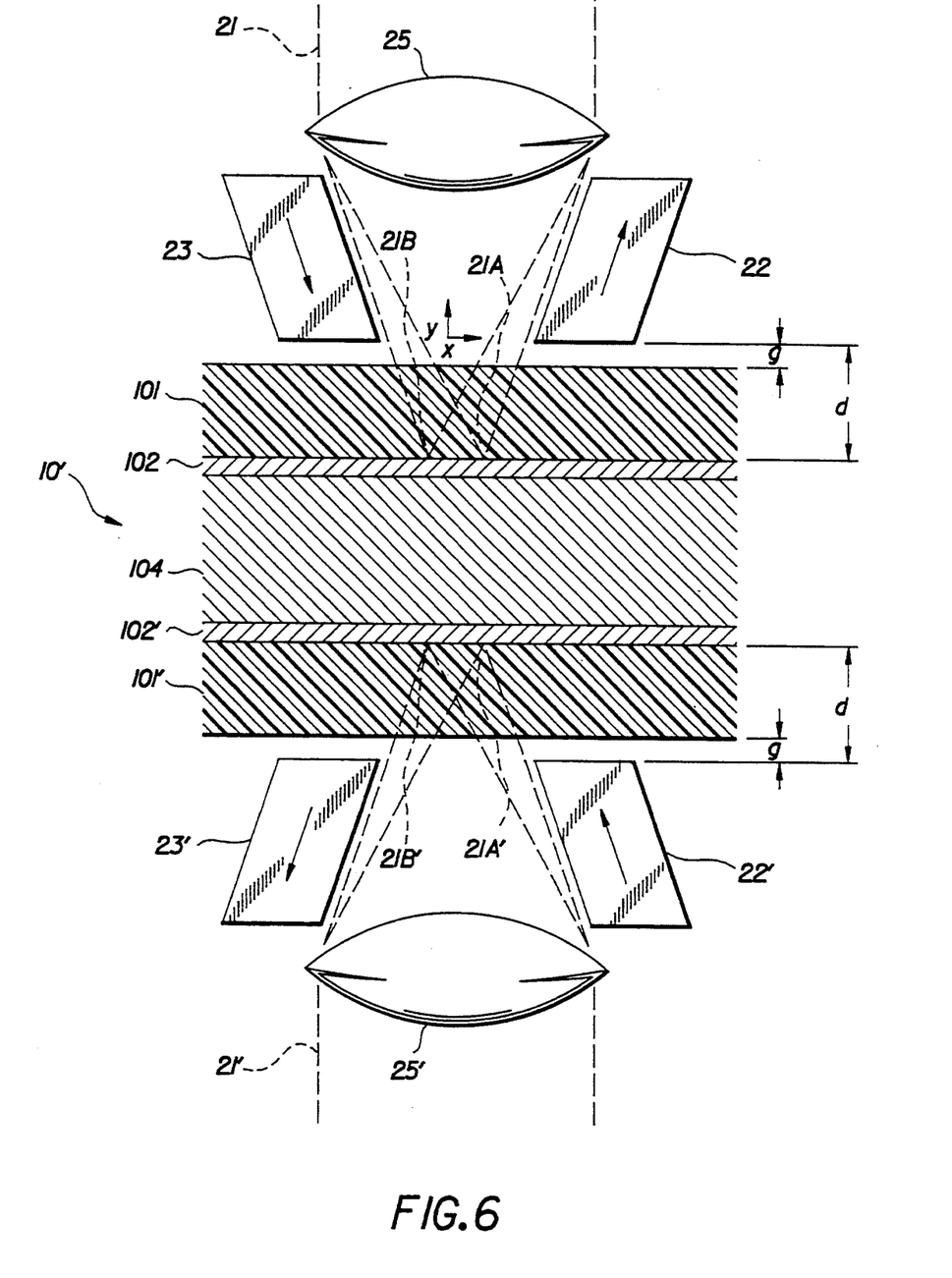
FIG. 6 is a cross-sectional diagram for apparatus capable of the simultaneous direct overwriting of information on both sides of a two-sided magneto-optical storage medium capable.

Referring next to FIG. 6, direct overwriting apparatus for simultaneously accessing both side of the two sided magneto-optical storage medium 10', shown in FIG. 5, includes a second pair of permanent magnets 22' and 23', a second radiation beam 21' having two radiation components 21A' and 21B', and a second focusing lens 25'. The second direct over-writing apparatus is located generally on the opposite side of the storage medium 10' and equi-distance therefrom. In order to make the magneto-optical storage medium 10' symmetrical, the orientation of the magnetic fields of the permanent magnets on opposite sides of the magneto-optical storage medium must be reversed as shown in FIG. 6. This configuration of the two permanent magnet pairs provides for a cancellation of the horizontal components of magnetic field in the region of the magneto-optical storage layer 102 and 102'. As with the configuration shown in FIG. 5, the substrate 104 must be sufficiently thick so that the heating of one magneto-optical storage layer does not affect the orientation of domains in the second magneto-optical layers.

Operation of the preferred embodiment can be understood in the following manner (FIG. 2). When the storage medium is moving in the direction indicated by the arrow v, the focused beam region 21A in conjunction with the magnetic field from magnet 22 changes the orientation of information-bearing regions of the magneto-optical recording layer to the orientation of the initialized recording layer prior to the storage of information thereon. The focused radiation beam region 21B in conjunction with the magnetic field from magnet 23 are provided with the opposite orientation to the initialized orientation when the focused radiation beam region 21B is heated above the magneto-optical orientation temperature. Thus, the information bearing regions are changed to a different set of information bearing regions by the configuration of FIG. 2.

In the preferred embodiment, the spacing between the beams and the magnet dimension in the in-track direction is approximately equal to the distance d between the magnet and the recording layer (assuming a magnet remanence $4\pi M_r = 11,000$ Gauss and the bias field $\geq 300$ Oe). An air gap, g, of 50 μm can be maintained by a typical focus actuator servo (±0.25 μm) and still provide a margin of error against a head crash. The spacer thickness is generally equal to the distance d-g and is approximately 0.3 mm for adequate defocusing of scratches, dust, etc. The beam spacing is somewhat less than d-g and the magnet dimensions are approximately d-g (in-track dimension) times 4d (cross-track dimension) times 4d (height). The mass of two 0.3 mm times 1.2 mm times 1.2 mm magnets would be approximately 7 mg compared to the ≈250 mg actuated mass of a typical head. The total mass of the actuated magnets and the associated support structure is less than 10% of the total actuated mass.

When the high permeability magnetic layer is present, both the perpendicular component and the in-track gradient of the magnetic field is improved. These improvements can be used to implement a larger air gap, g, or to decrease the spacing between the focused beam regions.

The horizontal component of the magnetic field from the first and second magnets, without a compensating field, places severe requirements on the anisotropy of the material. When the compensating magnet is added to the system, the horizontal component of the magnetic field in the vicinity of the focused radiation beams is minimized and the requirements on the magnetic properties of the magneto-optical storage layer is reduced.

It will be now appreciated that there has been presented apparatus which can provide a direct overwrite of a magneto-optical material. The apparatus is compact, light weight and, consequently does not seriously impact the performance of the actuator carrying the apparatus.

Operation of the present invention is believed to be apparent from the foregoing description and drawings, but a few words will be added for emphasis. The most popular optical storage medium is currently disk. The apparatus disclosed herein can be added to the tracking and focusing actuator with minimal impact with respect to space and weight. The apparatus provides that an optical disk, for which data areas have been formed along information tracks as magnetic domain having an opposite orientation to initially oriented domains in a magneto-optical material, has a selected region along an information track reinitialized to the initial domain orientation. Subsequently, the recently initialized region can have data stored thereon in the form of oppositely oriented magnetic domains.

While the invention has been described with particular reference to a preferred embodiment, it will be understood by those skilled in the art that various changes may be made and equivalents may be substituted for elements of the preferred embodiment without departing from invention. In addition, many modifications may be made to adapt a particular situation and/or material to a teaching of the invention without departing from the essential teachings of the present invention. For example, the two sets of direct over-writing apparatus shown in FIG. 6 need not be symmetrical in size or in distance from the magneto-optical storage layer, however, as will be clear, any departure from symmetry in these dimensions will require compensating changes in the parameters of the direct over-writing apparatus, e.g., the strength of the permanent magnetic.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

LIST OF PARTS 5 information track
10 magneto-optical storage medium
101 spacer layer
102 magneto-optical storage layer
103 high permeability magnetic material layer
104 substrate
11 first radiation beam
12 second radiation beam
13 first magnet
13A first magnetic field
14 second magnet
14A second magnetic field
15 initial information regions
16 final information regions
17 initialized magnetic region
21, 21' radiation beam
21A, 21B first radiation beam component
21B, 21B second radiation beam component
22, 22' a first magnet
23, 23' a second magnet
25, 25' focusing lens
31 field compensating magnet

What is claimed is:

1. Apparatus for the direct overwriting of an optical storage medium having a magneto-optical recording layer, wherein said recording layer is protected by a spacer layer, said medium being moved relative to said apparatus, said apparatus comprising:
   a first and a second radiation source;
   a condensing lens for focusing radiation from said first and said second radiation source on a first and a second region respectively of said recording layer, wherein a region illuminated by said first radiation source is thereafter illuminated by said second radiation source;
   a first and a second magnet, said first magnet proximate said first radiation beam and having a first magnetic pole proximate said first region without contacting said storage medium, said second magnet proximate said second radiation beam and having a magnetic pole opposite to said first magnetic pole proximate said second region, wherein said first magnet and said first radiation beam are selected to provide a first orientation of magnetic domains in said magneto-optical recording layer, said second magnet and said second radiation beam selected to provide a second orientation of magnetic domains in said magneto-optical storage medium.

2. The apparatus of claim 1 further comprising a compensating magnet, said compensating magnet positioned on an opposite side of said medium from a remainder of said apparatus, said compensating magnet minimizing a magnetic field component parallel to said magneto-optical storage layer in said first and said second regions.

3. The apparatus of claim 2 wherein said apparatus includes a magneto-optical disk having two magneto-optical storage layers and means for accessing either one of the two magneto-optical storage layers on said magneto-optical disk.

4. The apparatus of claim 1 wherein a distance between said first and said second regions is approximately equal to or less than a thickness of said spacer layer.

5. The apparatus of claim 1 wherein said optical storage medium has a layer of high permeability magnetic material.

6. The apparatus of claim 1 wherein said thickness of said spacer layer is approximately equal to or less than 0.3 mm.

7. The apparatus of claim 2 wherein regions oriented by said second magnet and said second radiation beam with said second orientation represent stored data.

8. The apparatus of claim 1 wherein said apparatus is positioned on an actuator of an optical storage system.

9. The apparatus of claim 1 wherein said storage medium further includes a second storage layer, said apparatus further comprising:
   a third and a fourth radiation source;
   a second condensing lens for focusing radiation from said third and said fourth radiation source on a third and a fourth region respectively of said second recording layer, wherein a region illuminated by said third radiation source is thereafter illuminated by said fourth radiation source;
   a third and a fourth magnet, said third magnet proximate said third radiation beam and having a third magnetic pole proximate said third region without contacting said storage medium, said fourth magnet proximate said fourth radiation beam and having an opposite magnetic pole proximate said fourth region, wherein said third magnet and said third radiation beam are selected to provide a third orientation of magnetic domains in said magneto-optical recording layer, said fourth magnet and said fourth radiation beam selected to provide a fourth orientation of magnetic domains in said magneto-optical storage medium.

10. The apparatus of claim 9 wherein said third and fourth regions are on a different magneto-optical storage layer than said first and said second regions.

11. The apparatus of claim 10 wherein said apparatus can access said first and said second regions while simultaneously accessing said third and said fourth regions.

12. A method for direct overwrite of data in a magneto-optical storage layer off an optical storage medium, said method comprising:
   by means of a condensing lens positioned on a first side of said storage medium, focusing a first radiation beam on a first region of said storage layer;
   by means of said condensing lens, focusing a second radiation beam on a second region of said storage layer;
   positioning a first magnet on said first side of said storage medium to apply a first magnetic field to said first region, said first magnetic field having a magnetic field component with a first direction relative to said storage layer;
   positioning a second magnet on said first side of said storage medium to apply a second magnetic field to said second region, said second magnetic field having a magnetic field component with a direction opposite to said first direction, wherein said first radiation beam and said first magnetic field result in magnetic domains in said storage medium with a first orientation in said first region, wherein said second radiation beam and said second magnetic field result in magnetic domains in said recording layer which an orientation opposite to said first orientation in said second region;

controllably reducing an intensity of said second beam provide said opposite orientation only for selected second regions; and moving an information track relative to said condensing lens and said first and said second magnet wherein said information track passes through said first region and subsequently through said second region.

13. The method of claim 12 further comprising a step of positioning a compensating magnet to minimize components of magnetic field parallel to said storage medium in a vicinity of said first and said second regions.

14. The method of claim 12 further comprising the steps of:

by means of a second condensing lens positioned on a second side of said storage medium, focusing a third radiation beam on a fourth region of a second storage layer of said storage medium;

by means of said second condensing lens, focusing a fourth radiation beam on a fourth region of said second storage layer;

positioning a third magnet on a second side of said storage medium to apply a third magnetic field to said third region, said third magnetic field having a magnetic field component with a third direction relative to said storage medium;

positioning a fourth magnet on said second side of said storage medium to apply a fourth magnetic field to said fourth region, said fourth magnetic field having a magnetic field component with a fourth direction opposite to said third direction, wherein said third radiation beam and said third magnetic field result in magnetic domains in said second storage layer with said third orientation in said third region, wherein said fourth radiation beam and said fourth magnetic field result in magnetic domains in said second storage recording layer with said fourth orientation opposite to said third orientation in said fourth region;

controllably reducing an intensity of said fourth beam provide said fourth orientation only for selected fourth regions; and moving an information track relative to said second condensing lens and said third and said fourth magnet wherein said information track passes through said third region and subsequently through said fourth region.

15. The method for direct overwrite of claim 14 wherein said storage medium includes a first and a second magneto-optical storage layer, said first and said second radiation beam interacting with said first magneto-optical storage layer, said third and said fourth radiation beam interacting with said second magneto-optical storage layer.

16. The method for direct overwrite of claim 12 wherein said magneto-optical storage layer has a spacer layer of thickness d-g coupled thereto, said method further including the step of adjusting said first and said second radiation beams whereby said first and said second regions are approximately a distance d-g apart.

17. The method for direct overwrite of claim 12 further including the step of including in said storage medium a layer of high permeability magnetic material.

18. The method for direct overwrite of claim 12 further comprising orienting an intensity of said second radiation beam whereby data is stored on said recording layer to have magnetic regions on said recording layer and which have opposite orientations.

19. The method for direct overwrite of claim 12 further including a step of moving said storage medium relative to said condensing lens whereby a selected information track is moving through said first region and then through said second region.

20. The method for direct overwrite of claim 16 wherein said spacer layer is approximately 50 $\mu$m from said first and said second magnet.

21. Apparatus for the direct overwrite of data on an information track of a magneto-optical recording layer of an optical storage medium, wherein said optical storage medium is moved relative to said apparatus, said apparatus comprising:

a condensing lens positioned on a first side of said storage medium, said condensing lens focusing a first radiation beam on a first region of said recording layer, said condensing lens focusing a second radiation beam on a second region of said recording layer;

a first magnet positioned on said first side of said storage medium, said first magnet having a first magnetic pole proximate said first region without contacting said storage medium; and a second magnet positioned on said first side of said storage medium, said second magnet having a second magnetic pole with a polarity opposite to a polarity of said first magnetic pole, wherein a first magnetic field from said first magnetic and said first radiation beam orient magnetic domains in said region with a first orientation, and wherein a magnetic field from said second magnetic and said second radiation beam orient magnetic domains in said second region with a second orientation opposite to said first orientation when an intensity of said second radiation beam is above a determined level.

22. The apparatus of claim 21 further comprising a compensating magnet positioned on an opposite said of said magneto-optical storage layer, said compensating magnet minimizing magnetic field components parallel to said magneto-optical storage layer in a vicinity of said first and said second regions.

23. The direct overwrite apparatus of claim 22 wherein said compensating magnet includes:

a third magnet positioned on a second side said storage medium, said third magnet having a third magnetic pole proximate a third region without contacting said storage medium; and a fourth magnet positioned on said second side of said storage medium, said fourth magnet having a fourth magnetic pole with a polarity opposite to a polarity of said third magnetic pole, said third and said fourth magnets positioned to cancel portions of the horizontal magnetic field in said first and second storage field locations.

24. The direct overwrite apparatus of claim 23 further comprising a second condensing lens positioned on said second side of said storage medium, said second condensing lens focusing a third radiation beam on a third region of a second recording layer, said second condensing lens focusing a fourth radiation beam on a second region of said second recording layer.

25. The direct overwrite apparatus of claim 24 wherein said apparatus can perform a direct overwrite on both storage layers of a storage medium simultaneously.

26. The direct overwrite apparatus of claim 21 wherein said storage medium includes a high permeability magnetic layer.

27. The direct overwrite apparatus of claim 26 wherein said storage medium has a spacer layer of thickness d-g, a distance between said first and said second region being approximately a distance d-g.

28. The apparatus of claim 27 wherein said thickness d is approximately equal to or less than 0.3 mm.

29. The apparatus of claim 21 wherein said an intensity of said second radiation beam is determined by data to be stored on said recording layer.

30. The apparatus of claim 29 wherein an information track of said recording layer transported through said first and said second regions.

31. The apparatus of claim 30 wherein regions accessed by said first and said second radiation beams having said second orientation on said track represent data stored on said information track.

* * * * *

UNITED STATES PATENT AND TRADEMARK OFFICE
CERTIFICATE OF CORRECTION

PATENT NO. : 5,381,390
DATED : January 10, 1995
INVENTOR(S) : Charles R. Brucker, et al.

It is certified that error appears in the above-indentified patent and that said Letters Patent is hereby corrected as shown below:

Claim 28, column 12, line 2, "d" should read --d-g--.

Signed and Sealed this

Twenty-second Day of August, 1995

Attest:

BRUCE LEHMAN

*Attesting Officer*      *Commissioner of Patents and Trademarks*